(12) United States Patent
Wick

(10) Patent No.: US 6,457,291 B2
(45) Date of Patent: Oct. 1, 2002

(54) FLOOR FRAME STRUCTURAL SUPPORT ASSEMBLY AND A METHOD OF MAKING THE SAME

(75) Inventor: John F. Wick, Mazomanie, WI (US)

(73) Assignee: Wick Building Systems, Inc., Mazomanie, WI (US)

( * ) Notice: Subject to any disclaimer, the term of this patent is extended or adjusted under 35 U.S.C. 154(b) by 0 days.

(21) Appl. No.: 09/282,297

(22) Filed: Mar. 31, 1999

Related U.S. Application Data

(60) Provisional application No. 60/080,069, filed on Mar. 31, 1998.

(51) Int. Cl.[7] .............................................. E04H 12/00
(52) U.S. Cl. .................... 52/653.1; 52/143; 52/650.3; 52/299; 280/789; 280/795
(58) Field of Search ................... 52/299, 143, 653.1, 52/643, 651.1, 654.1, 696, 650.3; 280/789, 795

(56) References Cited

U.S. PATENT DOCUMENTS

| | | | | |
|---|---|---|---|---|
| 3,042,423 A | * | 7/1962 | Bock | 52/653.1 |
| 3,759,547 A | * | 9/1973 | Ankeny | 280/789 X |
| 3,913,286 A | * | 10/1975 | Boutacoff | 52/653.1 X |
| 4,517,781 A | * | 5/1985 | LeBlanc | 52/299 |
| 4,930,809 A | | 6/1990 | Lindsay | 280/789 |
| 5,028,072 A | | 7/1991 | Lindsay | 280/789 |
| 5,201,546 A | | 4/1993 | Lindsay | 280/789 |
| 5,226,583 A | * | 7/1993 | Imashimizu et al. | 52/653.1 |
| 5,488,809 A | | 2/1996 | Lindsay | 52/653.1 |
| 5,579,622 A | | 12/1996 | De Von et al. | 52/653.1 |
| 5,640,814 A | * | 6/1997 | Godfrey | 52/143 |
| 5,664,388 A | * | 9/1997 | Chapman et al. | 52/653.1 |
| 5,718,048 A | * | 2/1998 | Horton et al. | 29/897.2 |
| 5,970,676 A | * | 10/1999 | Lindsay | 52/634 |
| 6,035,590 A | * | 3/2000 | Lindsay | 52/143 |

FOREIGN PATENT DOCUMENTS

| | | | | |
|---|---|---|---|---|
| FR | 1562963 | * | 4/1969 | 52/143 |

* cited by examiner

*Primary Examiner*—Lanna Mai
*Assistant Examiner*—Winnie Yip
(74) *Attorney, Agent, or Firm*—Michael Best & Friedrich LLP; Grady J. Frenchick; Charlene Yager

(57) ABSTRACT

A floor frame structural support assembly having a plurality of substantially parallel, longitudinal support members or beams, each of the support members having an inside-directed and an outside-directed wall surface, the inside-directed wall surfaces of the support members being substantially parallel. Disposed between the support members and affixed to the inside-directed surface thereof so as to prevent the inside surfaces from moving from their substantially parallel relationship during handling, transportation, and deployment, is a plurality of substantially rigid, bend-resistive, compression-resistive cross members. Affixed to the outside surfaces of the respective longitudinal support members so as to be substantially collinear with the axis of a respective cross member is a plurality of outriggers. The floor frame structural support assembly may include additional structure such as floor joists, marriage wall beams, exterior wall beams and wall portions which are affixed thereto. The floor frame structural support assembly being specifically designed for placement upon an eccentric load bearing support system.

A method of making the floor frame structural support assembly is also provided.

13 Claims, 7 Drawing Sheets

FLOOR FRAME STRUCTURAL SUPPORT ASSEMBLY AND A METHOD OF MAKING THE SAME

CROSS-REFERENCE TO RELATED APPLICATION

This application claims the benefit of U.S. Provisional Application No. 60/080,069, filed Mar. 31, 1998, which, including its attachments, is specifically incorporated herein by reference.

FIELD OF THE INVENTION

The present invention relates, generally, to the field of building construction including, but not limited to, house construction. Particularly, the present invention relates to manufactured home construction. More specifically, the present invention relates to a floor frame structural support assembly and to a method of making a floor frame structural support assembly for use in manufactured homes.

BACKGROUND OF THE INVENTION

Typically, floor frame assemblies are prefabricated or separately fabricated structures used to facilitate the construction of manufactured homes. Increasingly, homebuyers are choosing to use prefabricated sectional elements including floor frame assemblies in building new homes in order to reduce the cost of assembling and building new homes which is normally associated with traditional building methods. Manufactured homes with floor frame assemblies, walls, roof, windows, doors and similar structure are generally built in one or more locations such as a factory and then towed along public roadways to their final building sites to be mounted on supports in a safe, stable and reliable manner. The manufactured homes that satisfy certain government specifications are used in the construction of HUD code houses. Subassembly at one location, transportation to the building site and assembly on-site produces some demands for strength and versatility of the structure that is not required, for example, of a structure assembled directly on-site from generic building materials, e.g., wood, bricks, mortar, nails or the like.

Building structure sections for manufactured homes are sized to be transportable and a typical section uses a single floor frame assembly to serve as a floor support for the entire sectional unit. Although manufactured homes may employ single sectional units, many employ two or more sectional units including two or more floor frame assemblies, each of which provides a structurally sound base upon which to construct a separate sectional unit of a finished product. After two or more sectional units are individually transported to a final building site, the floor frame assemblies and sectional units are interconnected to create a stable home base.

One of the more important and more difficult problems which must be addressed in the production of homes assembled from subassembled sections is providing a suitable floor frame assembly which adequately supports a home after final assembly on-site. Over time, if a floor frame assembly is not designed to adequately handle the loads or forces applied thereto, floor joists will crown, the floor will slope or warp and damage to the walls and/or roof may occur. A workable floor frame assembly should also have sufficient strength and versatility to be handled and shipped multiple times and such a floor frame assembly also must be capable of supporting itself and supporting and protecting any additional structure(s) attached thereto.

It is therefore desirable to have a floor frame structural support assembly which can be mass-produced for cost effective reasons with as few structural variations as possible, which is strong enough to be incorporated into various manufactured home constructions and which is transportable to a final building site.

U.S. Pat. No. 5,579,622 describes a floor frame assembly for facilitating the construction of mobile and modular homes. The floor frame assembly of the '622 patent suffers the drawback of requiring the use of rectangular outriggers and very substantial overlying floor joists, wall perimeter rails and mating wall beams, as well as a large number of fasteners between the outriggers, floor joists and exterior wall beams. As will be explained more fully below, the floor frame assembly described in the '622 patent is not capable of placement upon an eccentric support or eccentric load bearing system. As shown in FIG. 3 of the '622 patent, the floor frame assembly described therein is designed for placement upon a uniform support or uniform load bearing system to prevent the floor frame assembly from bending.

U.S. Pat. Nos. 4,930,809, 5,028,072, 5,201,546 and 5,488,809, for example, disclose floor frame assemblies having various specific features. None of those floor frame assemblies achieve the versatility, strength and cost advantages of the present invention. More specifically, none of those floor frame assemblies are capable of operating with eccentric support or eccentric load bearing systems.

SUMMARY OF THE INVENTION

Briefly, in one aspect, the present invention includes a floor frame structural support assembly having a plurality of substantially parallel, longitudinal support members or beams, each of the support members having inside-directed and outside-directed wall surfaces, the inside-directed wall surfaces of the support members being substantially parallel. A plurality of substantially rigid, bend-resistive cross members disposed between the support members and affixed to the respective inside-directed surfaces thereof are provided so as to prevent the inside surfaces from moving from their substantially parallel relationship during handling, transportation and on-site construction. The floor frame structural support assembly further includes a plurality of outriggers each affixed to one or the other of the respective outside surfaces of the longitudinal support members to provide further rigidity to the overall floor frame structural support assembly.

In another aspect of the present invention, the above-described floor frame structural support assembly includes additional components such as floor joists, marriage wall beams and exterior wall beams to further support wall portions and a roof which are integral to a sectional unit for use in a manufactured home. The number of additional structural components and type, such as door and window frames, will be determined by the kind of building or house into which the floor frame structural support assembly is to be placed.

In yet another aspect of the present invention, a method of making a floor frame structural support assembly according to the present invention is provided. A plurality of longitudinal support members each having a longitudinal axis and an inside-directed surface and an outside-directed surface are provided. A plurality of bend-resistive, substantially rigid, cross members are also provided. The rigid cross members are permanently fixed to the inside surfaces of the longitudinal support members so as to maintain the support members in a substantially parallel relationship and to prevent significant relative movement of the longitudinal support members during handling, transportation and on-site deployment. A plurality of outriggers are provided and attached to the outside-directed wall surfaces of the longitudinal support members. The respective outriggers are generally perpendicular to the axis of the respective support member, substantially parallel to each other and substantially collinear with a cooperating cross member.

In another aspect of the present invention, floor joists, marriage wall beams, exterior wall beams, bearing blocks and other structural components may be attached to the floor frame structural support assembly so as to support further other structure members such as wall portions and a roof of sectional units designed for use in manufactured homes.

A principal feature of the present invention is that the floor frame structural support assembly is designed to be placed upon eccentric support or eccentric load bearing systems. The substantially rigid, compression-resistive cross members are specifically designed to be of sufficient strength to prevent the collapse of the cross members even when the floor frame structural support assembly is placed upon an eccentric load bearing support system. The cross members of the present invention are specifically designed to not only handle tension loads or forces, but to also handle compression loads or forces both of which are transferred to the cross members upon final on-site assembly.

Advantageously, the apparatus and method according to the present invention are of relatively simple construction and operation.

A feature of the present invention is to provide an economically-manufactured, strong, conveniently transportable floor frame structural support assembly which can be cooperatively mounted on-site with one or more other similar floor frame structural support assemblies as part of a building structure.

Another feature of the present invention is to provide a floor frame structural support assembly which can be mass produced, which includes uniform quality control, which optimizes manpower, which allows for the customizing of certain products for individual customers, and which is also of sufficient strength to withstand expected uses.

Yet another feature of the present invention is to provide a floor frame structural support assembly which can be supported in any number of different ways and yet is still capable of withstanding uneven load application without damage to itself or any structure supported thereby.

Still another feature of the present invention is to provide a floor frame structural support assembly that can be prefabricated, with or without additional structure to support, and can thereafter be towed in a safe and stable manner to its permanent destination. The prefabricated structure is designed to be transportable at highway speeds and also designed to resist incidental bouncing, and shock loading during transport without significant adverse effects.

Other features and advantages of the invention will become apparent to those skilled in the art upon review of the following detailed description, claims and drawings in which like numerals are used to designate like features.

Figure 1:
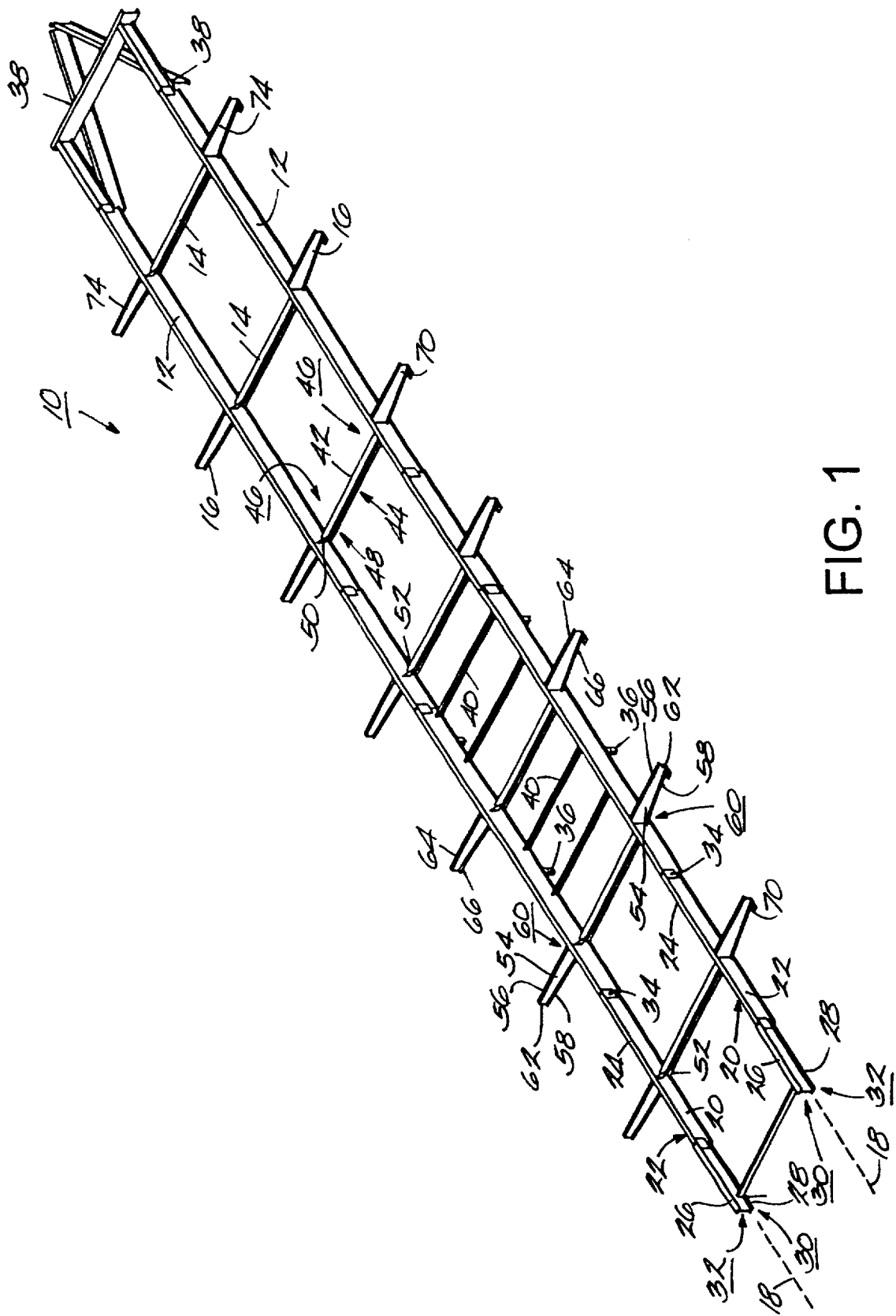
FIG. 1 is a perspective view of a floor frame structural support assembly of the present invention such as would be used in a multiple section manufactured home.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting.

DETAILED DESCRIPTION OF THE PREFERRED EMBODIMENTS

The extreme versatility provided by the use of the floor frame structural support assembly of the present invention will be appreciated by one skilled in the art. Whether a single section or a multiple section manufactured home is contemplated, the floor frame structural support assembly of the present invention provides handling, transportation and final assembly strength usable with a variety of support or "blocking" patterns without significant modification of the assembly. For example, 3, 4 and 5 point support or blocking for multi-sectional units can be used. Perimeter or basement support, e.g., for single section structures, is also possible. Further, the floor frame structural support assembly of the present invention has been found to permit wall and window location customization or changes without change in the assembly and with fewer changes in the blocking pattern. The floor frame structural support assembly of the present invention does not depend entirely upon the integration with floor joists to gain its strength as heretofore necessary in many prior art floor frame structures. Moreover, the floor frame structural support assembly of the present invention does not depend entirely upon large numbers of fasteners between outriggers and joists or end walls for added strength as is typical in many prior assemblies. Importantly, the floor frame structural support assembly of the present invention is capable of being supported by eccentric load bearing systems without damage to the floor frame structural support assembly or to the structure it supports. Contrastingly, typical prior floor frame assemblies are designed only to be supported by uniform load systems. As will be made more clear below, as can be appreciated by those skilled in the art, prior floor frame assemblies are not designed to withstand the compressive forces which are generated as a result of an eccentric load bearing system. Thus, as suggested above, in prior floor frame assemblies which are not designed to be supported by eccentric load bearing systems, if such a support system is used, over time, floor joists would crown and floors may slope or warp thereby causing further damage to the overall structure. Nonetheless, there are times when it would be economical or even preferred for assembly reasons to provide an eccentric load bearing support system. Accordingly, what is provided according to the present invention is a floor frame structural support assembly which is simple and economical to manufacture and which is yet also capable of providing the necessary support to prevent or eliminate damage to itself and to the structure it supports no matter how the floor frame structural support assembly is supported.

Figure 4:
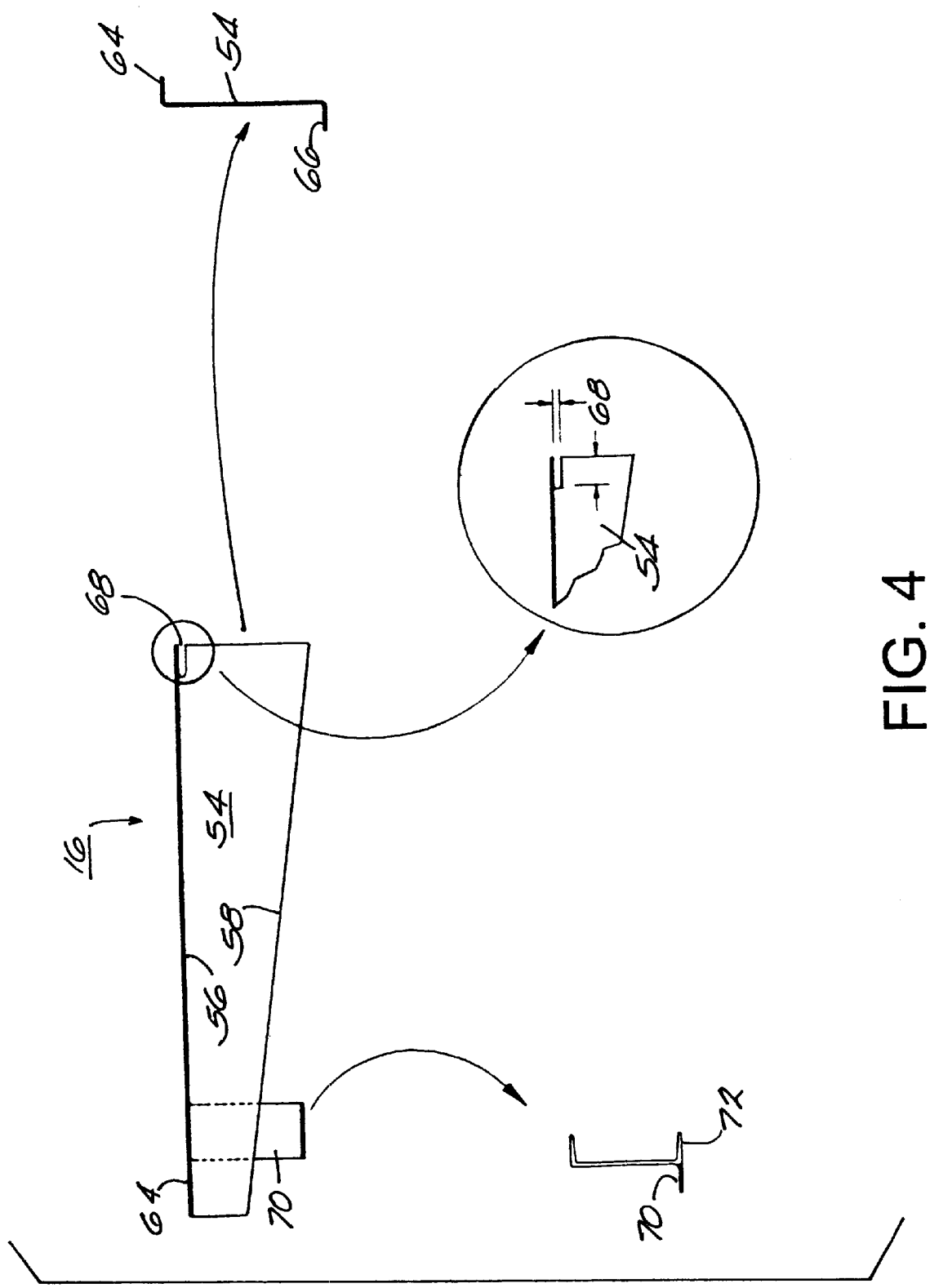
FIG. 4 is another cut-away view of another portion of the floor frame structural support assembly of FIG. 2 including two exploded partial views of certain components of this portion.
Figure 5:
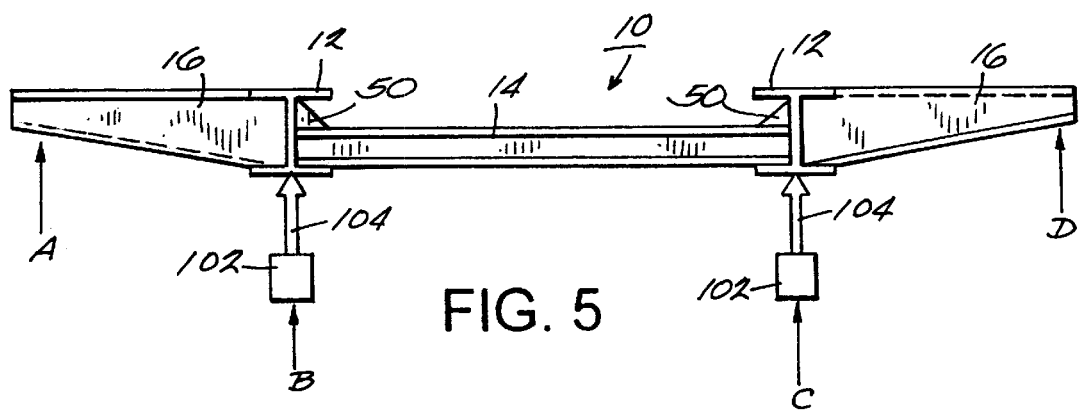
FIGS. 5–7 are representative schematic views of possible loading or blocking techniques in which a floor frame structural support assembly according to the present invention may be employed.
Figure 6:
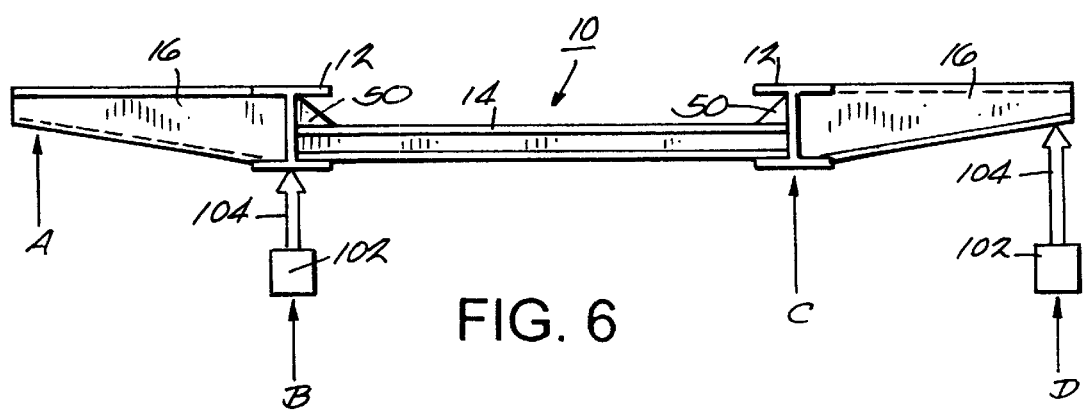
Figure 7:
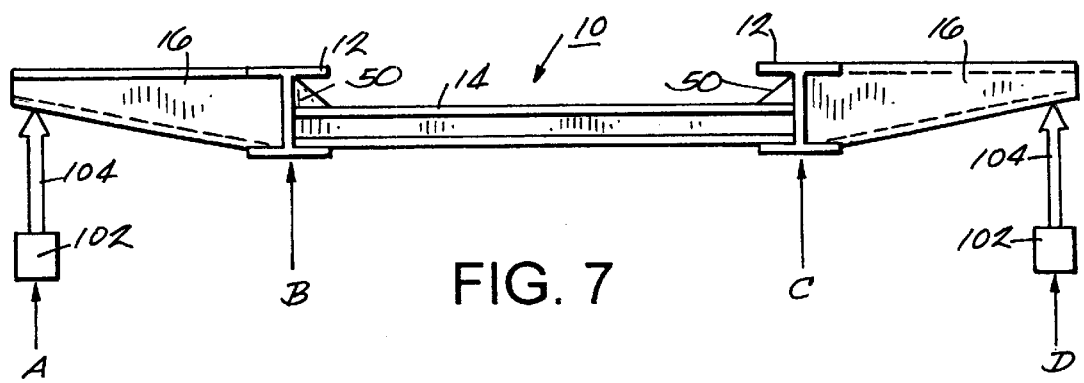
Figure 8:
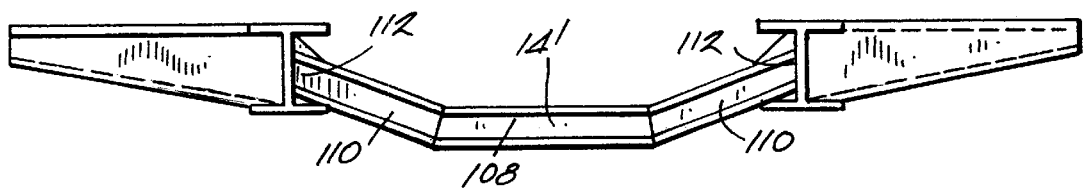
FIG. 8 is a second embodiment of the present invention in which a non-linear, substantially rigid cross member is used.
Figure 9:
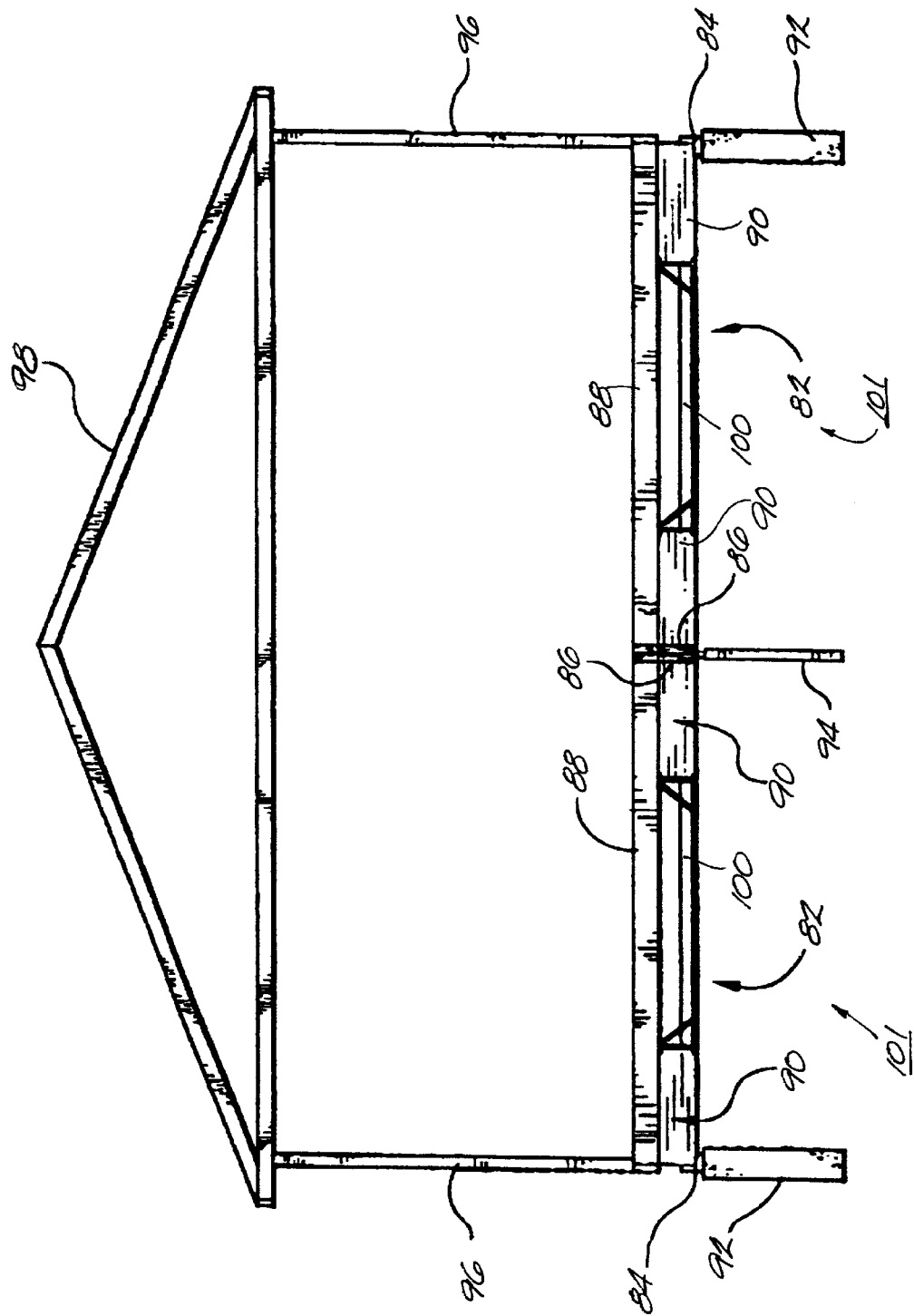
FIG. 9 is an end view of a prior art floor frame assembly placed on a building foundation and with parts of the building framework installed thereon illustrating a uniform support or uniform load bearing arrangement.
Figure 10:
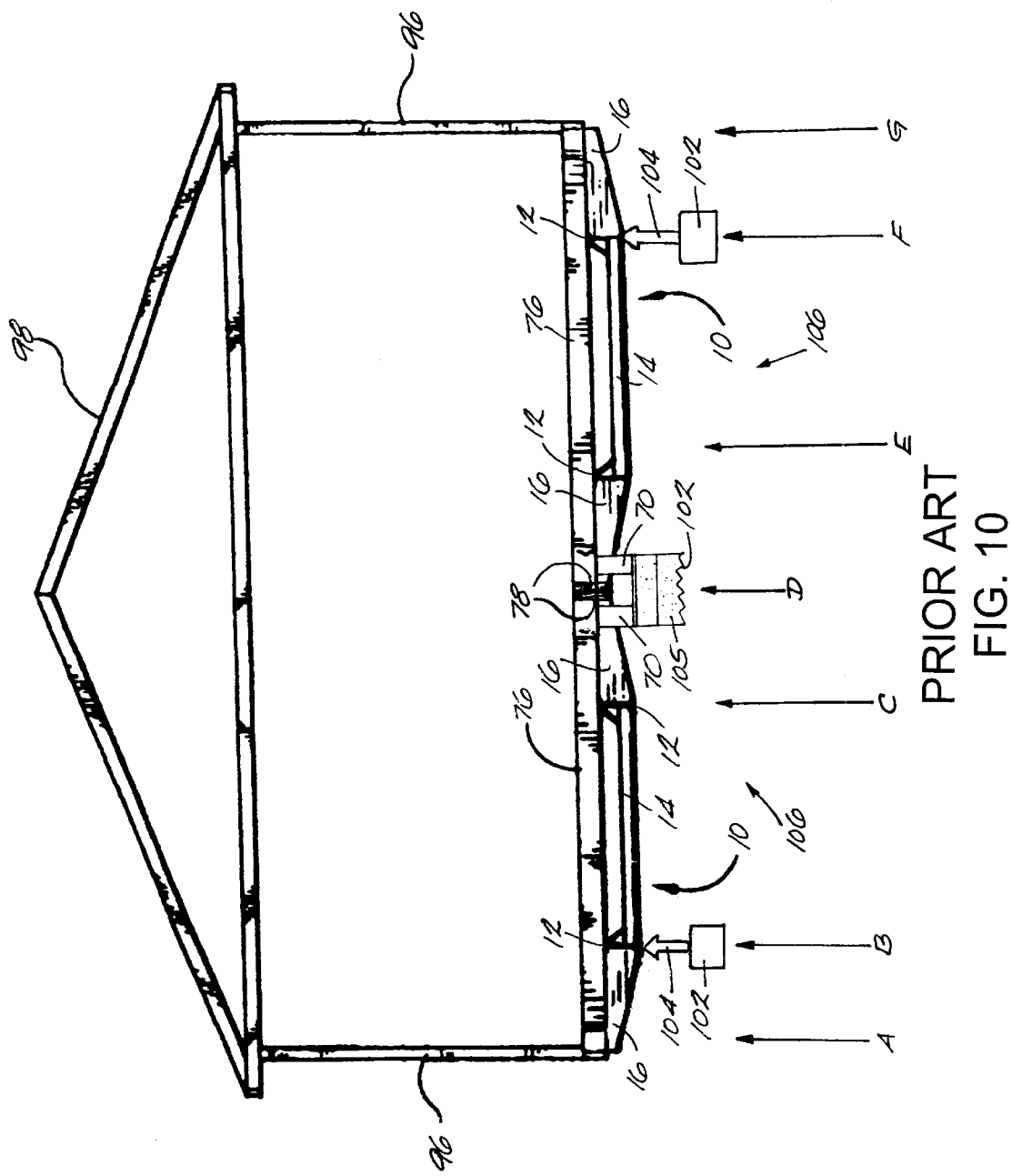
FIG. 10 is a partial schematic end view of two floor frame structural support assemblies with parts of a building framework installed thereon and placed upon an eccentric support or eccentric load bearing arrangement according to the principles of the present invention.

A first embodiment of the present invention is shown in FIGS. 1, 4 and a second embodiment of the present invention is shown in FIG. 8. FIGS. 5–7 are representative schematic drawings illustrating the versatility of the floor frame structural support assembly according to the present invention with respect to supporting or blocking the floor frame structural support assembly during transportation, assembly or final construction. FIG. 9 illustrates a prior art floor frame assembly subjected to a uniform load support system. FIG. 10 illustrates a floor frame structural support assembly according to the present invention in which a non-uniform or eccentric load bearing system is provided.

Referring to FIG. 1, there is shown a perspective view of a first embodiment of a floor frame structural support assembly 10 of the present invention, such as would be used in a single section or multiple section manufactured home. The floor frame assembly 10 is preferably made of metal, most preferably of steel which provides sufficient strength and rigidity to withstand expected uses as contemplated by the present invention. The floor frame assembly 10 includes a plurality of substantially parallel, longitudinal support members or support beams 12, a plurality of cross members or cross beams 14 and a plurality of outriggers 16.

Each of the longitudinal support members 12 has a longitudinal axis 18, an inside-directed (e.g., inward-directed) wall surface 20 and an outside-directed wall surface 22. The inside wall surfaces 20 of the support members 12 are substantially parallel. Most preferably, the support members 12 are "I" beams 24 but could also be constructed from beams with different cross sections according to the principles of the present invention. The "I" beams 24 have respective upper flange portions 26 and lower flange portions 28 forming a pair of "I" beam channels 30 and 32 therebetween. The support members 12 may be of a singular construction or may be of a plurality of sections spliced or welded together with splice plates 34 or by other known methods as well-known in the art depending on the overall length of the support members 12. Spring hangers 36 may extend downward from lower flange portions 28 as needed for transportation purposes as understood by those skilled in the art. If desired, a conventional hitch assembly including hitch beams 38 may be attached to one end of the assembly 10 also for transportation purposes. A plurality of cross members 40 may be positioned between support members 12 to aid in transporting the floor frame assembly 10 according to known methods.

A series of spaced, parallel cross members 14 extend between support members 12. Each cross member 14 is a substantially rigid, bend-resistive, compression-resistive cross member. The cross members 14 are preferably metal, most preferably steel which provide sufficient strength and rigidity to withstand expected uses as contemplated by the present invention. Specifically, the ability to place the cross members in compression as a result of an eccentric load bearing support system, which is further explained below, is a principal feature of the present invention. The terms "rigid" or "bend resistive" or "compression-resistive" as such pertain to the cross members 14 will be more fully explained below. In a preferred embodiment, each cross member 14 is similarly constructed, and consequently, any explanation with respect to a single cross member 14 has equal application to the other cross members 14.

Each cross member 14 has a top surface 42, a bottom surface 44 and a pair of opposite ends (e.g., opposing ends) 46. Each of the cross members 14 is disposed between the support members 12 and is affixed, e.g., fixedly attached, at each respective end 46 to one of the inside surfaces 20 of the respective support members 12. Advantageously, the disposition of the cross members 14 between the support members 12 prevents the inside surfaces 20 of the support members 12 from moving from their substantially parallel relationship during handling, transportation and final overall assembly of a completed manufactured home. The cross members 14 are oriented generally parallel to each other and generally perpendicular to the support members 12. Most preferably, the cross members 14 are "I" beams 48 which are welded to the inside-directed surfaces 20 of the longitudinal support members 12. Angled gusset plates 50 are disposed adjacent respective top surfaces 42 of the cross members 14. The angled gusset plates 50 are welded to the inside-directed surfaces 20 of the respective longitudinal support members 12 and the respective top surfaces 42 of the cross members 14. The gusset plates 50 so disposed at both ends of the respective cross members 14 further secure each cross member 14 with the support beams 12. In a preferred embodiment, the gusset plates 50 are made of 10-gauge steel.

Figure 3:
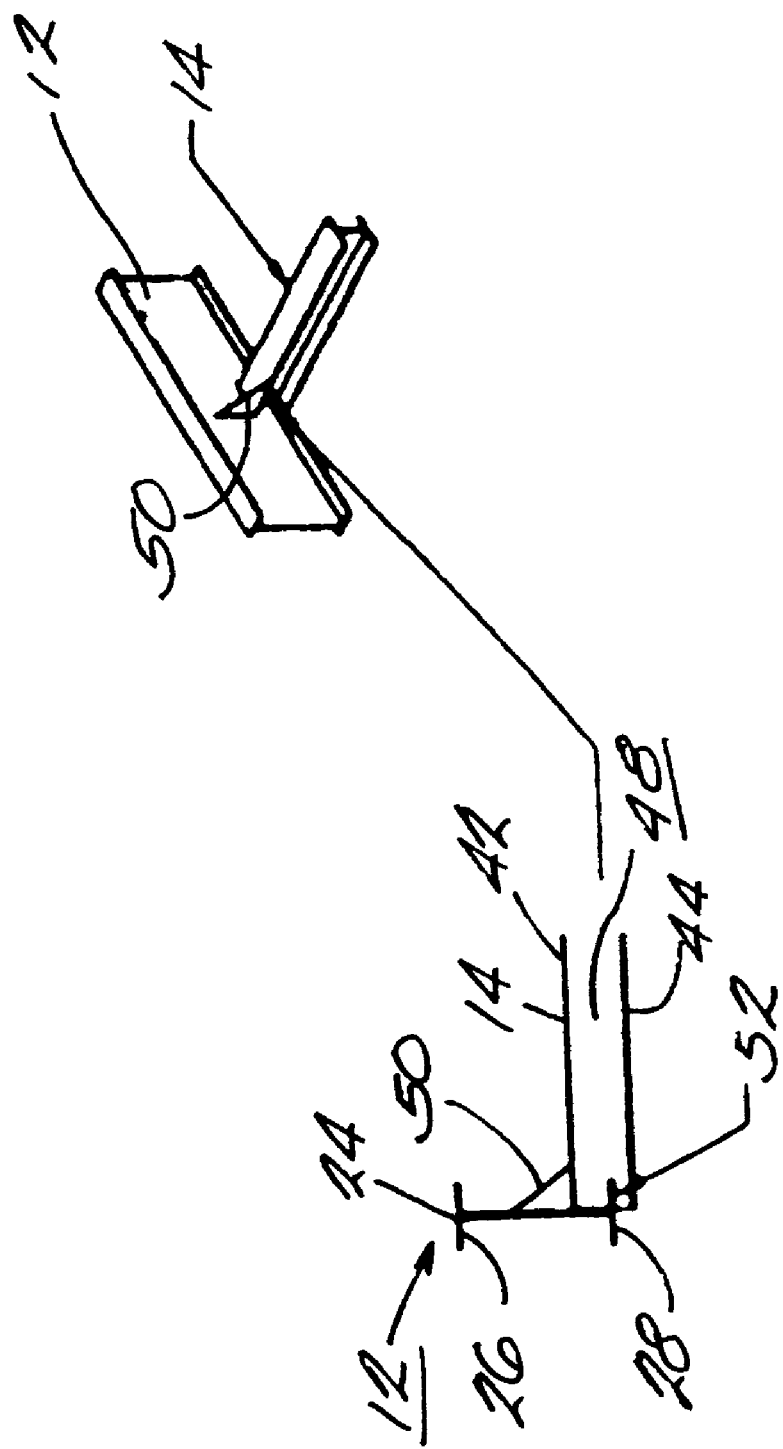
FIG. 3 is a cut-away view of a portion of the floor frame structural support assembly shown in FIG. 2 including a front view of the components of the portion.

FIG. 3 illustrates a preferred manner of attaching the cross members 14 to the support members 12. Each cross member 14 is notched at both ends so as to fit around the "I" beam flange or lower portions 28 of the support members 12. Once assembled, the bottom surface 44 of the cross member 14 or "I" beam 48 is located beneath the lower flange portion 28 of the support member 12 or "I" beam 24. The notched portion 52 is welded to the support member 12 or "I" beam 24. It should be appreciated that the cross members 14 may be fixed or welded to the support members 12 in any number of ways consistent with the principles of the present invention. For example, with additional reference to the schematic drawings shown in FIGS. 5–7, the bottom surface 44 of the cross members 14 may rest on respective top surfaces of the lower flange portions 28 of support members 12.

Returning to FIG. 1, a series of spaced, parallel outriggers 16 extend outward with respect to support members. 12. In a preferred embodiment, each outrigger 16 is similarly constructed, and consequently, any explanation with respect to a single outrigger 16 has equal application to the other outriggers 16. Each of the outriggers 16 is substantially perpendicular to the axis 18 of the respective support member 12 and is fixed to the outside surface 22 of the respective support member 12. Each of the outriggers 16 has a truncated triangular shaped planar body 54 having an upper edge 56 and a lower edge 58 as well as a pair of opposed ends 60 and 62. Upper edge 56 has an upper edge lip 64 oriented approximately parallel to or coplanar with the top surface of the upper flange portion 26 of the respective support member 12. The lower edge 58 has a lower edge lip 66 orientated approximately perpendicular to the triangular body 54. Preferably, the truncated triangular shaped planar body 54 is that of a truncated right triangle as shown. Preferably, opposed ends 60 and 62 are parallel to each other. In one preferred aspect, the opposed ends 60 are suitably dimensioned to snugly fit against outside-directed surfaces 22 within the respective "I" beam channels 30 of the respective support members 12. In a preferred embodiment, the outriggers 16 are also made of 10-gauge steel.

FIG. 4 illustrates another preferred manner of attaching the outriggers 16 to the support members 12. As shown, the outriggers 16 are preferably Z-shaped in cross section but may be of any suitable cross-section according to the principles of the present invention. Each body 54 of each outrigger 16 is notched so as to fit around the respective "I" beam flange of upper portion 26 of the respective support member 12. The notched portion 68 is welded to the support member 12 or "I" beam 24. It should be appreciated that the outriggers 16 may be attached to the support members 12 in any number of ways consistent with the principles of the present invention.

Returning back to FIG. 1, with additional reference to FIG. 4, each of the outriggers 16 may include a support leg or bearing block 70 which is fixedly attached to the respective outrigger 16 and which projects below the outrigger 16. As shown, the support leg 70 is shaped to fit under the upper edge lip 64 of outrigger 16, extend along the body 54, project beyond the lower edge lip 66 and project generally perpendicular to the body 54 to provide a bearing or blocking surface 72. The upper edge lip 64 and bearing surface 72 are preferably provided with holes (not shown) which allow fasteners to pass therethrough so as to enable the assembly 10 to be attached to a support structure and so as to enable floor joists to be attached to assembly 10.

Preferably, a pair of outriggers 16 and a respective cross member 14 are generally coplanar or collinear in order to enhance the features of the present invention. The outriggers 16 are oriented in groupings of two outriggers 16 forming outrigger pairs 74. One end 60 of each of the outriggers 16 of the outrigger pair 74 is fixed (e.g., attached) to the outside surface 22 of the respective support member 12 and oriented in such a manner that the end 60 is perpendicular to the longitudinal axis 18 of the support member 12 to which it is attached. The outrigger pairs 74 are oriented substantially parallel to each other with the individual outriggers 16 which are attached to one of the pair of the support members 12 being parallel to each other and substantially collinear with the axis of the respective cross member 14 located therebetween.

Most advantageously, the longitudinal support members 12, the rigid cross members 14 and the outriggers 16 cooperate to provide rigidity to the floor frame assembly 10 during handling, transportation, on-site deployment and subsequent final assembly. The present invention provides an extremely rigid floor frame structural support assembly upon which floor joists or other structure may be attached.

The versatility of the floor frame structural support assembly 10 of the present invention is very surprising and unexpected. For example, as alluded to above, one of the problems which the industry has struggled with is how to handle what is referred to as eccentric load supports or stresses, i.e., bearings or stresses which are not essentially collinear with the axis of the longitudinal support members 12. The occurrence of eccentric load supporting systems, especially in the context of final on-site construction, can result in substantial damage to any structure, such as drywall, supported by a floor frame assembly. The rigidity provided by the utilization of a cross member 14 discussed herein, in conjunction with a collinear outrigger pair 74 located so as to be substantially aligned therewith and perpendicular to the longitudinal support members 12, means that compressive forces generated by eccentric loads or stresses can be directed to the extremely rigid cross members 14 which, according to the present invention, can easily absorb them. In this manner, the concomitant damage which would normally occur as a result of eccentric loads is substantially eliminated.

Figure 2:
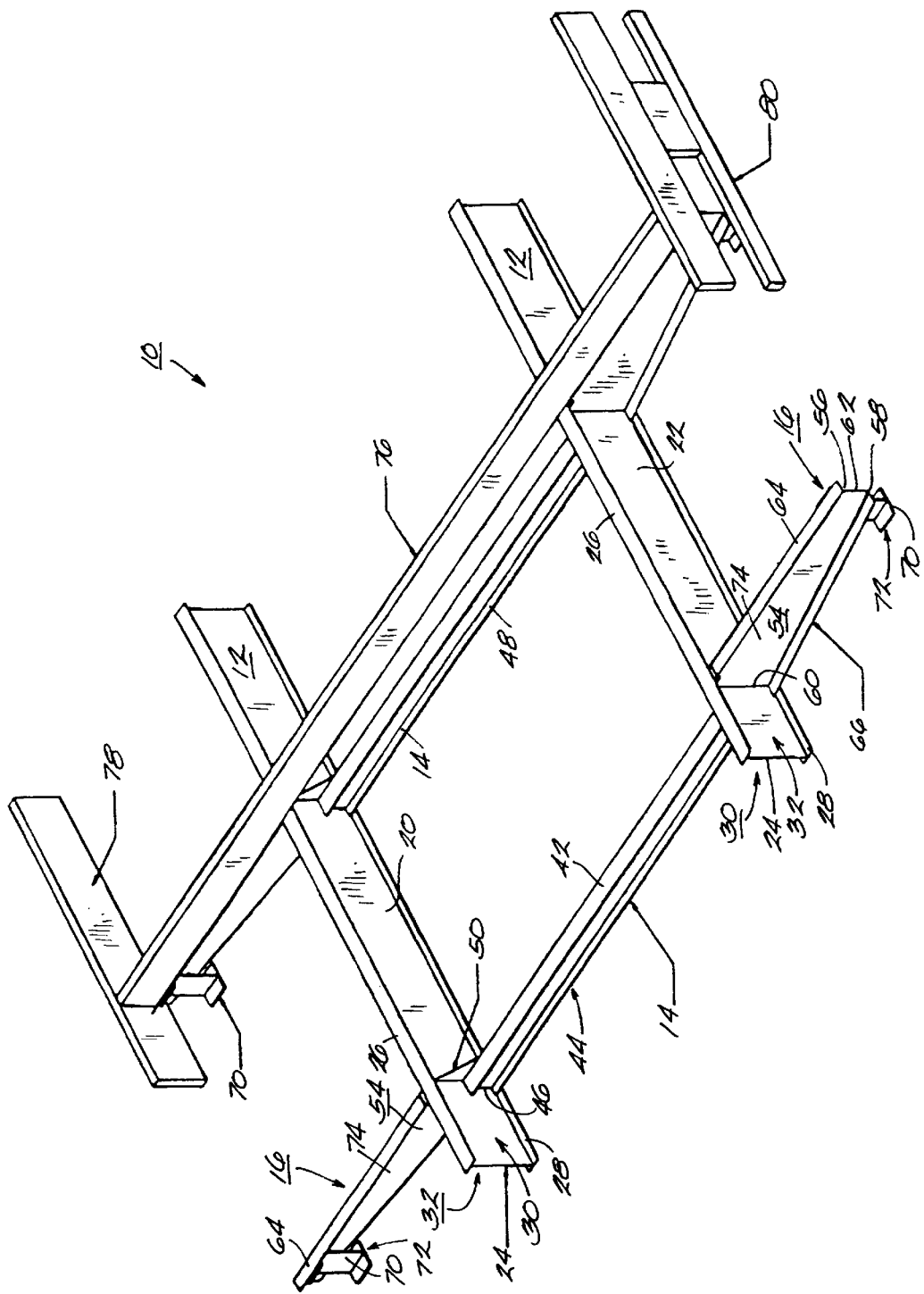
FIG. 2 is a partial perspective view of the floor frame structural support assembly shown in FIG. 1 with additional structure attached.

FIG. 2 is a partial perspective view of the floor frame structural support assembly 10 shown in FIG. 1 with a floor joist 76 attached to the floor frame structural assembly 10. The floor joist 76 is disposed horizontally resting on the support members 12 and on the upper edge lips 64 of the collinear outriggers 16. The floor joist 76 is disposed vertically between a marriage wall beam 78 and an exterior wall beam 80. The floor joists 76, marriage wall beam 78 and exterior wall beam 80 are shown fragmented in FIG. 2 for purposes of better illustrating the construction of the floor frame support assembly 10. In a preferred embodiment, the floor frame structural support assembly 10 can be placed eight foot on center to coincide with support posts placed eight foot on center.

FIG. 9 illustrates two floor frame assemblies 82 as described in the aforementioned '622 patent. Shown are outside wall perimeter rails 84, marriage wall beams 86, floor joists 88 and outriggers 90. The floor frame assemblies 82 are placed on a walled foundation 92. Perimeter rails 84 rest directly on and are supported by opposite foundation walls 92. It is possible to eliminate the rails 84 so that the outriggers 90 directly rest upon foundation walls 92. Facing wall beams 86 are bolted or otherwise fastened together, thereby rigidly securing together the assemblies 82. Jack post 94 is positioned directly underneath the attached wall beams 86 to provide a central support for assemblies 82. Sidewall framing 96 and roof trusses 98 are generally built over the floor joist assemblies in preparation for the application of siding and roofing. Each floor frame assembly 82 will carry a portion of the wall and roof structure for the building. The foundation walls 92 and center jack post 94 create a uniform support system 101 for the assemblies 82. As can be appreciated by those skilled in the art of stress analysis, the loads transmitted to the cross members 100 of each assembly 82 by the structure the floor frame assemblies 82 support and by the uniform support system 101 which supports the floor frame assemblies 82, will subject the cross members 100 to tension loads or forces. In other words, given the arrangement of the foundation walls 92 on the perimeters of the housing unit and the jack post 94 positioned to provide center support, loads or forces imposed upon the cross members 100 are tension loads rather than compression loads. Although the floor frame assembly 82 of the '622 patent has proven useful for situations involving uniform load support systems, the structure of the '622 patent is not capable of use where a floor frame assembly is desired to be placed upon an eccentric load bearing support system. The cross members of the '622 patent are not designed to handle the compressive forces which would be generated in the cross members as a result of an eccentric load support system.

FIG. 10 illustrates two floor frame assemblies 10 according to the present invention shown attached together for a multiple section manufactured home. Unlike the uniform load support system 101 of FIG. 9, the load supports (shown schematically as boxes 102 and arrows 104) and center block 105 provide an eccentric load bearing support system 106 when considering each assembly 10 individually. As can be appreciated by those skilled in the art of stress analysis, as a result of the eccentric load bearing system 106, the cross members 14 of the floor support assemblies 10 will be placed under compression. According to the principles of the present invention, as will be further explained below, the cross members 14 are of sufficient strength to prevent buckling or crumpling of the cross members 14 when subjected to eccentric load supports.

As previously noted, a problem with the floor frame assembly described in the '622 patent is that it is not designed for compatibility with eccentric loading systems. However, it has been determined that at times it is desirable to place a manufactured home upon an eccentric load bearing system such as that shown in FIG. 10. For example, it has been observed that approximately 70–80% of new manufactured homes are not placed on basement settings. A basement setting typically includes a uniform loading system such as that shown in FIG. 9. For these homes, it would sometimes be beneficial to be able to block or support the overall structure on something other than a traditional basement set. As can be appreciated by those skilled in the art, on-site construction issues associated with blocking on a traditional basement set, such as being able to properly provide skirting around the outside lower perimeters of the manufactured home, can cause problems with respect to utilizing a traditional basement set.

Another problem with having to use a uniform load support system arises in the context of displaying manufactured homes for future sale. So as not to damage the overall structure, distributors and retailers must be equipped to provide a load support system which will not damage the structure of the manufactured home before final sale. Moreover, prior to the present invention, if a retailer or distributor ordered a manufactured home for sale and the home was set up for a basement setting, the home had to be sold for use with a basement setting. This limits the options available to retailers and distributors in selling manufactured homes. These drawbacks add considerable expense to the seller's bottom line and takes away some of the profits which could be realized. Thus, it would be beneficial to provide a floor frame structural support assembly which is capable of eccentric blocking without subjecting the overall structure to damage normally attributed to such eccentric techniques. It would also be beneficial to provide a floor frame structural support assembly which allows distributors and retailers the option of ordering a manufactured home for one type of setting but still allow the manufactured home to be sold for another nontraditional setting.

FIGS. 5–7 are representative schematic views of possible loading or blocking techniques in which a floor frame structural support assembly 10 according to the present invention may be employed. As previously noted, the present invention may be employed in single section or multiple section manufactured homes. The resulting floor structures typically are supported either on upright basement walls (such as those shown in FIG. 9) or on metal or masonry posts disposed underneath the floor frame structural support assembly (such as those shown in FIGS. 9 and 10). Although the present invention is capable of use in any sized manufactured homes, typical single section manufactured homes are usually 14 or 16 feet wide and typical double section manufactured homes are 28 or 32 feet wide. Generally, all manufactured homes range from 40 to 80 feet in length. FIGS. 5–7 schematically show only single sections. As shown in FIG. 10, the single sections of FIGS. 5–7 can be combined with other single sections to provide a multiple section manufactured home. For purposes of illustrating possible loading techniques, reference is made to FIGS. 5–7 in conjunction with the illustration of FIG. 10.

As can be observed, a double section configuration provides seven possible loading positions. Reading from left to right in FIG. 10, the first loading position A corresponds to the outer end of one outrigger 16 or bearing surface 72 of bearing block 70 (if a bearing block 70 is utilized); the second loading position B corresponds to the location under outer support beam 12 of the first floor frame assembly 10; the third loading position C corresponds to the location under the inner support beam 12 of the first floor frame assembly 10; the fourth loading position D corresponds to the marriage location between the marriage beams 78; the fifth loading position E corresponds to the location under the inner support beam 12 of the second floor frame assembly 10; the sixth loading position F corresponds to the location under the outer support beam 12 of the second floor frame assembly 10; and the seventh loading position G corresponds to the outer end of another outrigger 16 or bearing surface 72 of bearing block 70 (if a bearing block 70 is used). FIGS. 5–7 schematically show load techniques for locations A–D. Load locating E–G would be found in a mating floor frame assembly 10 such as shown in FIG. 10.

Typically, in double section manufactured homes, prior blocking schemes are usually A, D, G (such as shown in the '622 patent); or B, C, E, F; or B, C, D, E, F. A problem with prior floor frame assemblies is that a floor frame assembly designed with a cross member to accommodate a loading technique corresponding to A, D, G; or B, C, E, F; or B, C, D, E, F is not capable of use in an eccentric or uneven loading technique corresponding to B, D, F, for instance. As previously noted, the cross members of prior floor assemblies are not of sufficient strength to handle eccentric loads nor are they capable of multiple loading variations.

A principal feature of the present invention is to provide a floor frame structural support assembly that not only is capable of withstanding large compressive loads, but is also capable of being loaded or supported in any number of different locations without resulting damage to the structure it supports. Further features of the present invention include providing a cross member of sufficient strength to withstand multiple load forces which results in lesser need for larger wood floor joist framing commonly found in prior floor systems. An additional benefit of the continuous cross beam floor system 10 according to the present invention is the ability to allow sectional manufactured homes to be set upon a 3-point eccentric blocking system instead of the traditional 4-point or 5-point blocking system. This will save considerable expense in equipment and labor costs associated with traditional 4-point and 5-point blocking systems.

According to the present invention, each cross member 14 is a substantially rigid, bend-resistive, compression-resistive cross member. The terms "rigid" or "bend-resistive" or "compression-resistive" mean that the cross member 14 resists a bending moment of at least 26,000 in-lbs., preferably at least 42,000 in-lbs., and more preferably at least 65,000 in-lbs. In some cases, it may be desirable to provide a cross member which resists a bending moment upwards of 100,000 in-lbs. In comparison, prior non-compression resistive cross members are typically designed to only resist small bending moments in the neighborhood of 5,000 in-lbs. Resistive bending moments as contemplated for use according to the present invention are determined by multiplying an accepted or calculated section modulus for a particular beam, such as cross beam 14, to the chosen allowable yield point for the same beam. Many standard manuals on steel construction will provide the necessary variables for beams contemplated for use herein. The Ninth Edition of the Manual of Steel Construction on Allowable Stress Design is such a manual. A maximum unbraced length for a chosen beam can be found in these types of manuals. The unbraced length for a cross beam 14 (e.g., between support beams 12) must be less than the maximum allowed unbraced length for the particular chosen beam according to the standard charts. Although a maximum yield is provided for such beams, a safety factor is typically used. Meaning, the usable yield point is only a predetermined percentage of the maximum yield point. The noted calculation will provide the bending moment resistance for a particular beam. An S4×7.7 lb/ft steel beam works well according to the principles of the present invention.

Before determining what size of beam to provide for cross members 14, the possible bending moment applied to a cross member must be calculated. Given the construction of a pair 74 of outriggers 16 and a cross member 14, generally the largest bending moment applied to the system will be found somewhere along the cross member 14, typically, near one of the gusset braces 50. Knowing various parameters such as the roof live load, roof dead load, floor live load, floor dead load, wall dead load, frame dead load, width of the overhangs, the properties of the floor joists and other marriage wall joints etc., and the location of the loading support system underneath the floor frame assembly 10, one skilled in the art of stress analysis can determine the net bending moment at any location along the cross member 14 in in-lbs. Having calculated the maximum bending moment that will be applied to the cross member 14 for a given structural assembly, a cross member can be chosen that is capable of withstanding such a bending moment. Having chosen a cross member that is capable of withstanding the maximum bending moment that will be applied to the cross member 14, the cross member 14 can be supported according to any blocking technique as representatively shown in FIGS. 5–7 and FIG. 10 without fear of damaging the cross member 14 or any structure supported by the floor frame structural support assembly 10. In other words, the cross member 14 is capable of withstanding any tension or compression loads or forces as applied thereto consistent with the principles of the present invention.

FIG. 8 shows a second embodiment of the present invention in which a non-linear rigid cross member 14' is used. The second embodiment of the present invention differs from that of the first embodiment of the present invention, only in the design of the cross member 14'. Gusset 50 may be removed from this design if desired. All other elements are identical to those disclosed, hereinbefore, in the first embodiment. The cross member 14' is angled having a trapezoidal center section 108 and a pair of trapezoidal shaped end sections 110 fixedly attached together such as by welding. Each of the end sections 110 has an outer end 112. Each end 112 is fixedly attached to the inside directed wall surface 20 of one of the respective support members 12. A cross member 14' of sufficient strength can be chosen according to the methods described above. Such a cross member is also capable of use with eccentric load support systems. Other cross-sectional cross members may be used according to the principles of the present invention. The dimensions of any cross member should be such to make it possible during the process of manufacturing the floor frame structural support assembly to include ventilation ducting, piping, electrical power and telephone lines, wiring, waste pipes, thermal insulation, and the like, for easy connection to sources of warm or cold air, hot or cold water, and the usual electrical power and telephone lines from outside.

A method of making the floor frame structural support assembly 10 of the present invention, includes the following steps: providing a plurality of longitudinal support members 12 each having a longitudinal axis 18, an inside-directed surface 20 and an outside-directed surface 22; providing a plurality of bend-resistive, substantially rigid, cross members 14 or (14'); fixedly attaching (e.g., permanently fixing) the rigid cross members 14 (or 14') to the inside-directed surfaces 20 of the longitudinal support members 12 so as to maintain the support members 12 in a substantially parallel relationship and to prevent significant relative movement of the longitudinal support members 12 during handling, transportation and on-site final assembly of the manufactured home; providing a plurality of outriggers 16; attaching the outriggers 16 to the outside-directed surfaces 22 of the longitudinal support members 12 perpendicular to the longitudinal axis 18 of the support members 12, substantially parallel to each other and substantially collinear with a cross member 14 (or 14').

The method further includes the steps of providing a plurality of floor joists 76 and fixedly attaching the floor joists 76 to the longitudinal support members 12 and the outriggers 16. In one aspect of the above method, the marriage wall beams 78, exterior wall beams 80, bearing blocks 70 and other structural components, as well as, the floor joists 76, may be attached to the floor frame structural support assembly 10, as needed.

The foregoing description of the present invention has been presented for purposes of illustration and description. Furthermore, the description is not intended to limit the invention in the form disclosed herein. Consequently, variations and modifications commensurate with the above teachings in skill or knowledge of the relevant art, are within the scope of the present invention. The embodiments described herein are further intended to explain the best modes known for practicing the invention and to enable others skilled in the art to utilize the invention as such, or other embodiments and with various modifications required by the particular applications or uses of the present invention. It is intended that the appended claims are to be construed to include alternative embodiments to the extent permitted by the prior art.

Various features of the invention are set forth in the following claims.

What is claimed is:

1. A floor frame structural support assembly comprising:
   a pair of substantially parallel, longitudinal support members, each longitudinal support member having an inside-directed and an outside-directed wall surface, the inside wall surfaces of the support members being substantially parallel;
   a plurality of spaced apart substantially rigid non linear, compression-resistive cross members, the cross members being disposed between the support members and fixed to the inside surfaces thereof so as to prevent the inside surfaces of the longitudinal support members from moving from their substantially parallel relationship during handling, transportation and final assembly;
   a plurality of spaced apart outriggers, each outrigger having a generally Z-shaped cross-section with a truncated triangular body, an upper edge lip and a lower edge lip, all of which extend between a pair of opposed ends, the outriggers being substantially perpendicularly fixed to the outside surfaces of the longitudinal support members such that pairs of the outriggers are respectively substantially collinear with a selected one of the plurality of cross members, whereby the longitudinal support members, rigid cross members, and outriggers cooperate to provide rigidity to the floor frame structural support assembly during handling, transportation, on-site deployment and subsequent use;

a plurality of support legs, one for each outrigger, each support leg being fitted under the upper edge lip, extend along the body, and project beyond the lower edge lip of the associated outrigger, each support leg including a bearing surface which extends generally perpendicular to the associated outrigger and which is adapted for placement on a load bearing support member of a load bearing support system; and wherein said floor frame structural support assembly is positionable upon the load bearing support system, such that at least a plurality of the support legs are placed upon at least one load bearing support member of the load bearing support system, the load bearing support system being arranged in such a way that stresses may be unevenly applied to each of said longitudinal support members, and wherein said cross members are of sufficient strength to prevent damage from occurring to said floor frame structural support assembly as a result of the uneven load bearing forces which may be applied to said longitudinal support members.

2. A floor frame structural support assembly according to claim 1, wherein the assembly further includes floor joists positioned above the assembly.

3. A floor frame structural support assembly according to claim 2, wherein the assembly further includes at least one upstanding wall positioned above the floor joists.

4. A floor frame structural support assembly according to claim 1, wherein the cross members have at least a resistive bend moment of about 26,000 in-lb.

5. A floor frame structural support assembly according to claim 1, wherein the cross members have at least a resistive bend moment of 42,000 in-lb.

6. A floor frame structural support assembly according to claim 1, wherein the cross members have at least a resistive bend moment of 65,000 in-lb.

7. A floor frame structural support assembly according to claim 1, wherein the cross members have at least a resistive bend moment of 100,000 in-lb.

8. A floor frame structural support assembly according to claim 1, wherein the cross members are S4×7.7 lb/ft steel beams.

9. A floor frame structural support assembly according to claim 8, wherein the outriggers are of 10-gauge steel.

10. A floor frame structural support assembly according to claim 1, wherein the cross members are "I" beams, the cross members being attached to the inside-directed surfaces of the longitudinal support members and to respective angled gusset plates disposed adjacent a top surface of a respective cross member, the angled gusset plates also being attached to the respective inside-directed surfaces of the longitudinal support members.

11. A floor frame structural support assembly according to claim 1, wherein the support members and the cross members are I-beams, wherein the support members include upper and lower flange portions and, wherein the cross members include opposite ends and a top and bottom surface and, wherein the opposite ends of the cross members include notched portions such that the notched portions are adapted to receive the lower flange portions of the support members in such a way that once affixed thereto, the bottom surfaces of the cross members are below the lower flange portions of the support members.

12. A floor frame structural support assembly according to claim 1, wherein the ends of the outrigger adjacent the respective support members include a notched portion and wherein a portion of the respective support member is fitted within the notched portion such that once connected, top surfaces of the outriggers are substantially parallel with top surfaces of the support members.

13. A support assembly for a floor, said assembly comprising:

a first and a second floor frame structural support assembly, each of said first and second floor frame structural support assemblies including a pair of substantially parallel, longitudinal support members, each longitudinal support member having an inside-directed and an outside-directed wall surface, the inside wall surfaces of the support members being substantially parallel;

a plurality of spaced apart substantially rigid, compression-resistive cross members, the cross members being disposed between the support members and fixed to the inside surfaces thereof so as to prevent the inside surfaces of the longitudinal support members from moving from their substantially parallel relationship during handling, transportation and final assembly;

a plurality of spaced apart outriggers, each outrigger having a generally Z-shaped cross-section with a truncated triangular body, an upper edge lip and a lower edge lip, all of which extend between a pair of opposed ends, the outriggers being substantially perpendicularly fixed to the outside surfaces of the longitudinal support members such that pairs of the outriggers are respectively substantially collinear with a selected one of the plurality of cross members, whereby the longitudinal support members, rigid cross members, and outriggers cooperate to provide rigidity to the floor frame structural support assembly during handling, transportation, on-site deployment and subsequent use;

a plurality of support legs, one for each outrigger, each support leg being fitted under the upper edge lip, extend along the body, and project beyond the lower edge lip of the associated outrigger, each support leg including a bearing surface which extends generally perpendicular to the associated outrigger, and which is adapted for positioning on a load bearing support member of a load bearing support system;

wherein said first and second floor frame structural support assemblies are positioned relative to one another such that a portion of said plurality of outriggers of said first floor frame structural support assembly is adjacent to a portion of said plurality of outriggers of said second floor frame structural support assembly thereby creating a marriage center portion; and wherein each of said first and second floor frame structural support assemblies is positionable upon a respective load bearing support system, such that at least a plurality of the support legs of each floor frame structural support assembly are positioned upon at least one load bearing support member of the respective load bearing support system, the load bearing support system being arranged in such a way that stresses may be unevenly applied to each of said longitudinal support members of said first and second floor frame structural support assemblies, and wherein said cross members of each of said first and second floor frame structural support assemblies are of sufficient strength to prevent damage from occurring to each of said first and second floor frame structural support assemblies as a result of the uneven load bearing forces which may be applied to the respective longitudinal support members.

* * * * *